United States Patent [19]

Montgomery

[11] Patent Number: 5,792,307

[45] Date of Patent: Aug. 11, 1998

[54] APPARATUS FOR FORMING A CORRUGATED SUBSTRATE

[75] Inventor: Dale E. Montgomery, Prosper, Tex.

[73] Assignee: Lin Pac, Inc., Atlanta, Ga.

[21] Appl. No.: 554,441

[22] Filed: Nov. 6, 1995

Related U.S. Application Data

[63] Continuation-in-part of Ser. No. 380,510, Jan. 30, 1995, Pat. No. 5,537,936, which is a continuation-in-part of Ser. No. 190,481, Feb. 2, 1994, Pat. No. 5,463,965.

[51] Int. Cl.$^6$ .................... B32B 31/04; B31F 1/20
[52] U.S. Cl. .................... 156/364; 156/210; 156/264; 156/362; 156/512; 156/517; 156/556
[58] Field of Search .................... 156/210, 556, 156/264, 557, 207, 362, 363, 364, 512, 517, 521; 428/184, 186

[56] References Cited

U.S. PATENT DOCUMENTS

| | | |
|---|---|---|
| 1,802,880 | 4/1931 | Cumfer . |
| 1,955,833 | 4/1934 | Romanoff .................... 428/186 |
| 2,504,473 | 4/1950 | Van Antwerpen . |
| 2,856,826 | 10/1958 | Norquist et al. . |
| 3,150,576 | 9/1964 | Gewiss . |
| 3,228,273 | 1/1966 | Huffman . |
| 3,468,734 | 9/1969 | Shields . |
| 3,470,053 | 9/1969 | Rule . |
| 3,792,952 | 2/1974 | Hamon . |
| 4,306,932 | 12/1981 | Bradatsch et al. . |
| 4,314,868 | 2/1982 | Hirakawa et al. .................... 156/210 |
| 4,493,743 | 1/1985 | Lunding .................... 156/556 |
| 4,647,063 | 3/1987 | Piringer et al. .................... 428/186 |
| 4,657,611 | 4/1987 | Guins .................... 156/210 |
| 4,792,325 | 12/1988 | Schmidtke . |
| 4,886,563 | 12/1989 | Bennett et al. . |
| 4,935,082 | 6/1990 | Bennett et al. . |
| 5,062,340 | 11/1991 | Greven .................... 156/197 |
| 5,083,996 | 1/1992 | Smith . |
| 5,147,480 | 9/1992 | Lang . |
| 5,151,151 | 9/1992 | Kao et al. . |
| 5,201,513 | 4/1993 | Mion . |
| 5,217,556 | 6/1993 | Fell .................... 156/470 |
| 5,413,662 | 5/1995 | Skinner, III .................... 156/264 |
| 5,433,156 | 7/1995 | Hutchison .................... 428/186 |

*Primary Examiner*—Michele K. Yoder
*Attorney, Agent, or Firm*—Finnegan, Henderson, Farabow, Garrett & Dunner, L.L.P.

[57] ABSTRACT

An apparatus for forming a corrugated substrate comprises a first assembly for advancing liner sheets including a corrugated medium and facing sheets and a second assembly for advancing fluting sheets. Each fluting sheet has bend surfaces along its top and bottom sides. An applicator applies adhesive along at least one of the top and bottom sides of the fluting sheets. The first assembly and second assembly advance the liner sheets and fluting sheets into contact with one another along the side of the fluting sheet having the adhesive. The fluting sheets are secured to the liner sheets to form a layered article having an upper and lower surface. A means for correlating operates the first assembly, second assembly, and applicator so that in each cycle of operation the layered article adheres to at least an additional layered article in succession. The correlating means preferably operates such that another one of the liner sheets adheres along an exposed one of the top and bottom sides of one of the fluting sheets of the layered article corresponding to the upper and lower surface of the layered article, respectively.

12 Claims, 11 Drawing Sheets

APPARATUS FOR FORMING A CORRUGATED SUBSTRATE

This is a continuation-in-part of application Ser. No. 08/380,510, now U.S. Pat. No. 5,537,986 filed on Jan. 30, 1995, which is a continuation-in-part of Ser. No. 08/190,481, now U.S. Pat. No. 5,463,965 filed on Feb. 2, 1994.

BACKGROUND OF THE INVENTION

The present invention relates to an apparatus and method for forming a corrugated substrate structure used to support a load and, more particularly, to an apparatus and method capable of forming corrugated substrates of various thicknesses and strengths.

Wood, metal, plastic, and paper are frequently manufactured into load supporting devices. One of the least expensive and most easily manipulated materials is paper. Various structures, such as corrugated paperboard, take advantage of the strength of paper by properly forming items to exploit paper's inherent characteristics. Specifically, a strip of corrugated paperboard is readily bent traversely of its plane, however, the strip has considerable tensile and compressive strength when subjected to edgewise pressure.

Various support structures for supporting a load take advantage of the relative low cost and pliable nature of paper.

However, a less dense, higher strength, and more rigid structure for supporting a load is needed while maintaining low cost and light weight.

For example, pallets and skids of corrugated paperboard have gained considerable popularity within the industry for use in transporting various goods. In comparison to wooden pallets, corrugated paperboard, pallets and skids are lighter to transport and less expensive to make. Additionally, paperboard skids can be shredded for disposal, recycled to reduce refuse costs, and nonreturnable to eliminate return transportation costs. Corrugated paperboard skids are even lighter and less expensive than paperboard pallets. Since the skids do not have bottom slats they occupy less space in storage and shipping due to the advantage offered by alternate stacking.

As with the paper support structures described above, support structures made of metal and/or plastic are available with varying degrees of strength and rigidity. The same principles applicable to exploiting the strength of paper by utilizing the corrugation process may be applied with metal and plastic. Paper, plastic, and metal may be increased and thickened to provide the desired strength. However, with this buildup of mass comes weight, size, and cost to an end product. Optimally, a support structure should have a high strength-to-weight ratio that optimizes the material's strength characteristics and minimizes the amount of material utilized to maintain low cost.

In light of the foregoing, there is a need for an apparatus and method for forming a corrugated support structure which has the desired strength and rigidity to support a load, yet is relatively light and inexpensive. In particular, there is a need for an apparatus and method for forming a corrugated substrate quickly and inexpensively, yet with the flexibility to form substrates of various thicknesses and strengths to meet the requirements of various design demands.

SUMMARY OF THE INVENTION

Accordingly, the present invention is directed to an apparatus and method for forming a corrugated support structure that overcomes the limitations and disadvantages of the related art.

Additional features and advantages of the invention will be set forth in the description which follows, and in part will be apparent from the description, or may be learned by practice of the invention. The objective and other advantages of the invention will be realized and attained by the support structure for supporting a load particularly pointed out in the written description and claims hereof as well as the appended drawings.

To achieve these and other advantages in accordance with the purpose of the invention, as embodied and broadly described, the invention comprises a first assembly for advancing liner sheets including a corrugated medium and facing sheets and a second assembly for advancing fluting sheets.

Each fluting sheet has bend surfaces along its top and bottom sides. An applicator applies adhesive along at least one of the top and bottom sides of the fluting sheets. The first assembly and second assembly advance the liner sheets and fluting sheets into contact with one another along the side of the fluting sheet having the adhesive. The fluting sheets are secured to the liner sheets to form a layered article having an upper and lower surface. A means for correlating operates the first assembly, second assembly, and applicator so that in each cycle of operation, the layered article adheres to at least an additional layered article in succession. Each additional layered article adheres to a preceding layered article. The correlating means preferably operates the first assembly, second assembly, and applicator so that another one of the liner sheets adheres along an exposed one of the top and bottom sides of one of the fluting sheets of the layered article corresponding to the upper and lower surface of the layered article, respectively.

Further, the invention may comprise a first assembly for advancing liner sheets including a corrugated medium and facing sheets and a first applicator for applying adhesive. A second assembly advances fluting sheets having bend surfaces along its top and bottom sides. The first applicator applies adhesive along a selected one of the top and bottom sides of the fluting sheets. At least one of the first assembly and the second assembly advances the liner sheets and fluting sheets into contact with one another along the selected one of the top and bottom sides of the fluting sheets. The fluting sheets are thereby secured to the liner sheets to form a layered article. A second applicator applies adhesive to the bend surfaces along a remaining one of the top and bottom sides of the fluting sheets of the layered article corresponding to a remaining one of an upper and lower surface of the layered article. A means for correlating operates the first assembly, first applicator, second assembly, and second applicator so that in each cycle of the operation, the layered article adheres to at least an additional layered article in succession in each cycle of operation. Each additional layered article adheres to a preceding layered article. The correlating means also may ensure that another one of the liner sheets adheres along the remaining one of the upper and lower surface of the layered article.

The invention may also include a liner bed adapted to support a stack of liner sheets and a fluting bed adapted to support a stack of fluting sheets. The liner bed and fluting bed may be oriented substantially adjacent to the first assembly and second assembly, respectively. Preferably, the first assembly and second assembly include a conveyor assembly for advancing the corrugated liner sheets and fluting sheets, respectively, one by one. The invention may also include an embossing assembly for receiving blank sheets from the fluting bed and for forming the sheets into fluting sheets having bend surfaces along top and bottom sides thereof. Further, each of the liner sheets and fluting sheets are preferably formed of material selected from a group consisting of metal, paperboard, and plastic.

Additionally, the invention may include a stacker for receiving each of the layered articles and the liner sheets for final assembly of the corrugated substrate. The correlating means may control each cycle of the operation so that the layered article is fed to the stacker and secured to at least an additional layered article in succession in each cycle of operation. Another one of the liner sheets is fed directly to the stacker without application of adhesive from the first and second applicator. At least two of the layered articles are preferably fed in succession to the stacker during each cycle of operation so that the thickness of the corrugated substrate may be varied. The correlating means preferably includes means for regulating the thickness of the corrugated substrate so that in each cycle of operation at least one layered article is fed to the stacker.

In addition, the invention comprises a method for forming a corrugated substrate from corrugated material comprising the steps of: providing liners including a corrugated medium and facing sheets and undulating corrugated strips having bend surfaces along opposite sides thereof; connecting one of the liners to the bend surface along one of the sides of one of the undulating corrugated strips to form a layered article; and controlling the thickness of the substrate by depositing at least one additional layered article in succession in each cycle of operation, whereby each additional layered article adheres to a preceding layered article. Further, the invention may include the step of introducing at least an additional one of the liners into the succession of additional layered articles to further control thickness and strength of the structure. The additional one of the liners adheres to a preceding one of the layered article or to a preceding one of the corrugated liners.

It is to be understood that both the foregoing general description and the following detailed description are exemplary and explanatory only, and are not restrictive of the invention, as claimed.

BRIEF DESCRIPTION OF THE DRAWINGS

The accompanying drawings are included to provide a further understanding of the invention and are incorporated in and constitute a part of this specification. The drawings illustrate several embodiments of the invention and together with the description, serve to explain the principles of the invention. In the drawings.

DESCRIPTION OF THE PREFERRED EMBODIMENTS

Figure 1A:
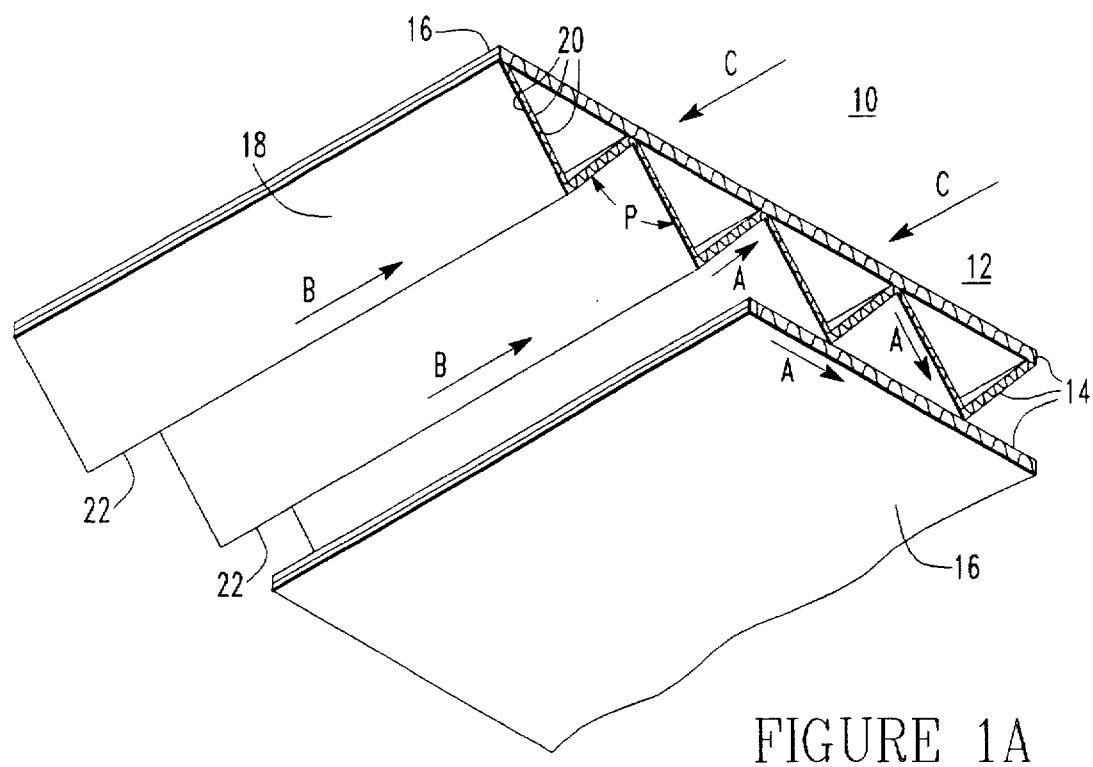
FIGS. 1A–1D are perspective views, partially cut-away, of support structures according to the present invention.
Figure 1B:
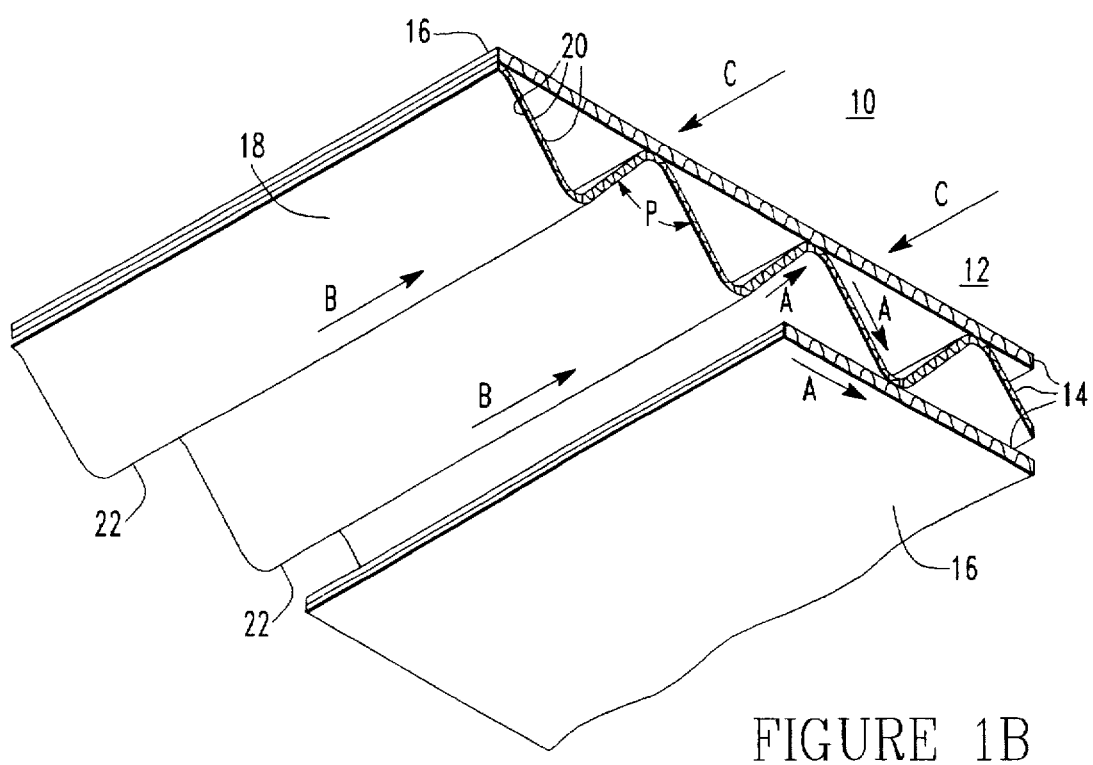
Figure 1C:
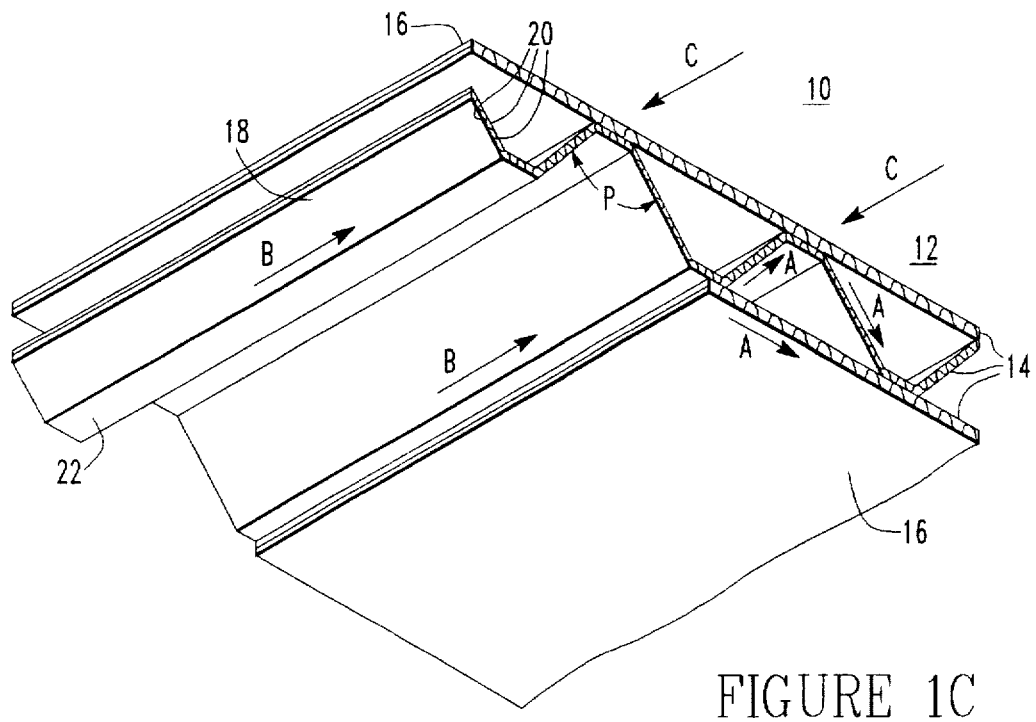

Reference will now be made in detail to the present preferred embodiments of the invention, examples of which are illustrated in the accompanying drawings. Reference will first be made to a corrugated substrate or support structure, which is the product to which the apparatus and method of the present invention are intended to form. An understanding of the intended product should facilitate the disclosure of the preferred apparatus and method of the present invention and variations thereon. The exemplary embodiment of a support structure in accordance with the present invention is shown in FIGS. 1A–1D and is designated generally by the reference numeral 10.

Figure 2A:
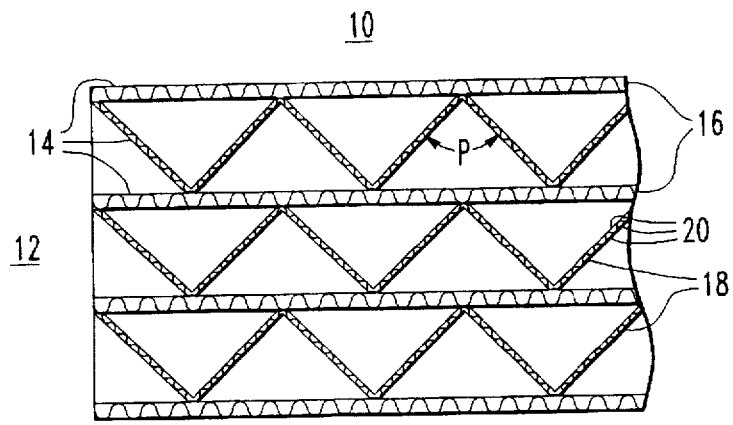
FIG. 2A–2C are a top views of built-up support structures according to the present invention.
Figure 2B:
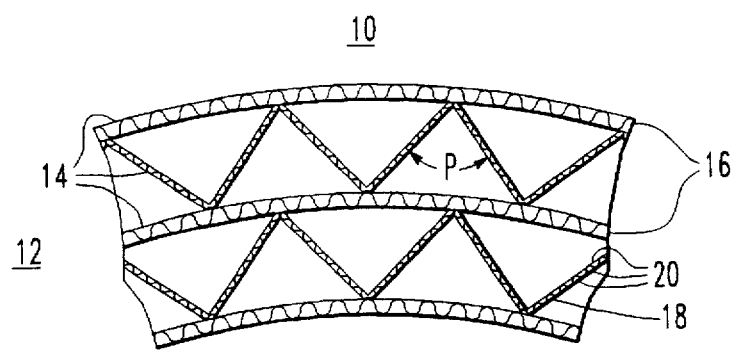
Figure 2C:
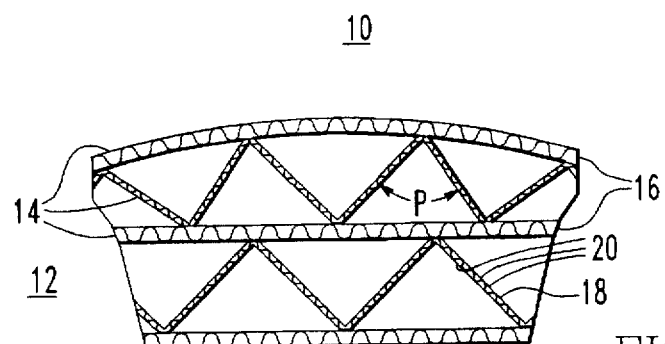

As embodied herein and as shown in FIG. 1A, the support structure 10 for supporting a load includes a core 12 of connected strips 14 including spacer strips 16 of corrugated material and at least one bent strip 18 of laminated material 20. The bent strip 18 is disposed between opposing spacer strips 16 and secured to opposing spacer strips at bend surfaces 22 spaced apart along the bent strip 18. The bent strip 18 and the opposing spacer strips 16 have edge surfaces designated generally by arrows A. The edge surfaces define a plane substantially perpendicular to the bend surfaces 22 as further designated along arrow B. The direction of the compressive load, for which the support structure 10 is particularly well adapted, is indicated by arrows C. The spacer strips 16 are preferably substantially parallel. However, the spacer strips 16 may be curved, parallel, or a combination of the two as shown in FIGS. 2A–2C. While the preferred spacer strips 16 are substantially parallel, it is contemplated as well within the scope of this invention that the spacer strips 16 may be configured into various shapes depending on the design requirements of the support structure 10.

The spacer strips 16 and bent strip 18 are preferably formed of corrugated paperboard. Alternatively, depending on the strength and weight requirements of the support structure to be designed and the environment in which it will be used, the spacer strips 16 and bent strip 18 may be formed of plastic and/or metal or a combination of materials selected from plastic, paper, and metal.

The bent strip 18 is preferably formed of corrugated paperboard when the spacer strips 16 are made of corrugated paperboard. However, many multiple layer paper laminates may provide the stiffness and spacing to meet the strength, rigidity and weight requirements of a particular design. Another preferred multiple paper laminate for the bent strip 18 is chip board.

The bent strip 18 may be creased at substantially equal intervals to form the bent surfaces 22 along opposite sides of the bent strip 18. Preferably, an adhesive is applied along the bend surfaces 22 for securing the bent strip 18 to the opposing spacer strips 16 and for holding the bent strip 18 at a predetermined pitch angle P. Alternatively, an additional adhesive may not be necessary for securing the bent surfaces 22 of the bent strip 18 to the opposing spacer strips 16. For example, the entire support structure is injection molded out of plastic so the strips are integrally connected to one another. In addition to separating the spacer strips 16 to provide a strong and light-weight support structure 10, the bent strips 18 strengthen and reinforce the spacer strips 16 traverse of their plane. The bent strip 18 may have bend surfaces 22 that are sharp creases, gradual curves, or substantially planar contact surfaces, as shown in FIGS. 1A–1D.

The pitch angle is preferably between about 30 and 150 degrees. A more preferred pitch angle P is about 110 degrees.

Figure 1D:
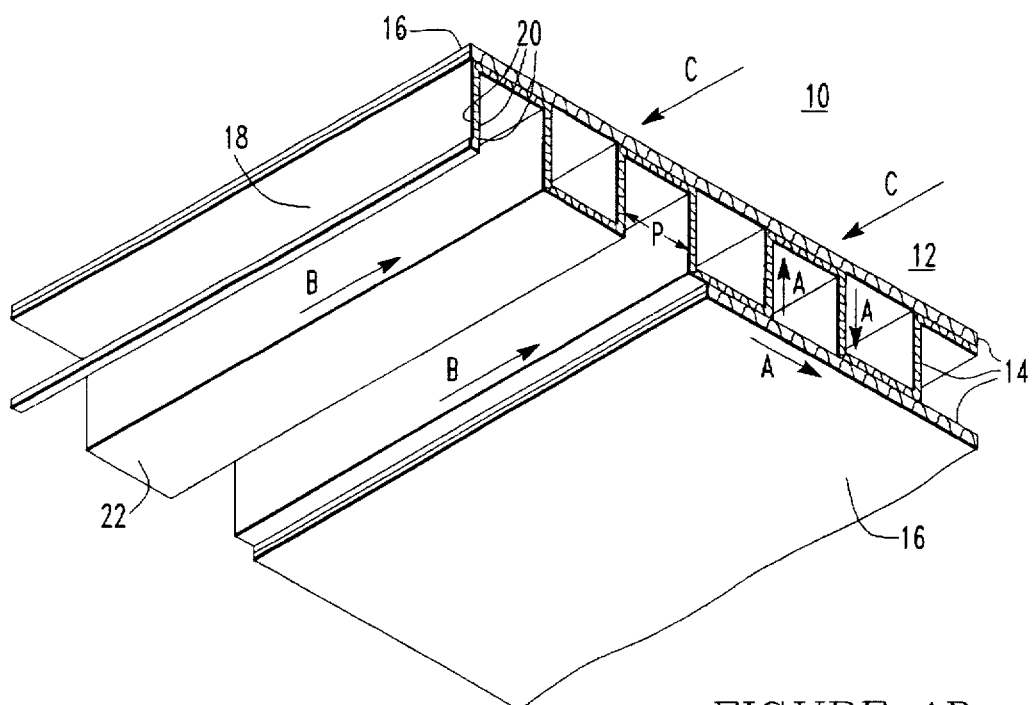

However, as shown in FIG. 1D, the pitch angle P may be zero degrees if one desires a support structure 10 having portions of the bent strip 18 perpendicular to the plane of the opposing spacer strips 16. Moreover, the bend surfaces 22 and pitch angle P may be varied along the bent strip 18 for meeting different strength, rigidity, and weight requirements of a desired support structure 10.

Figure 3:
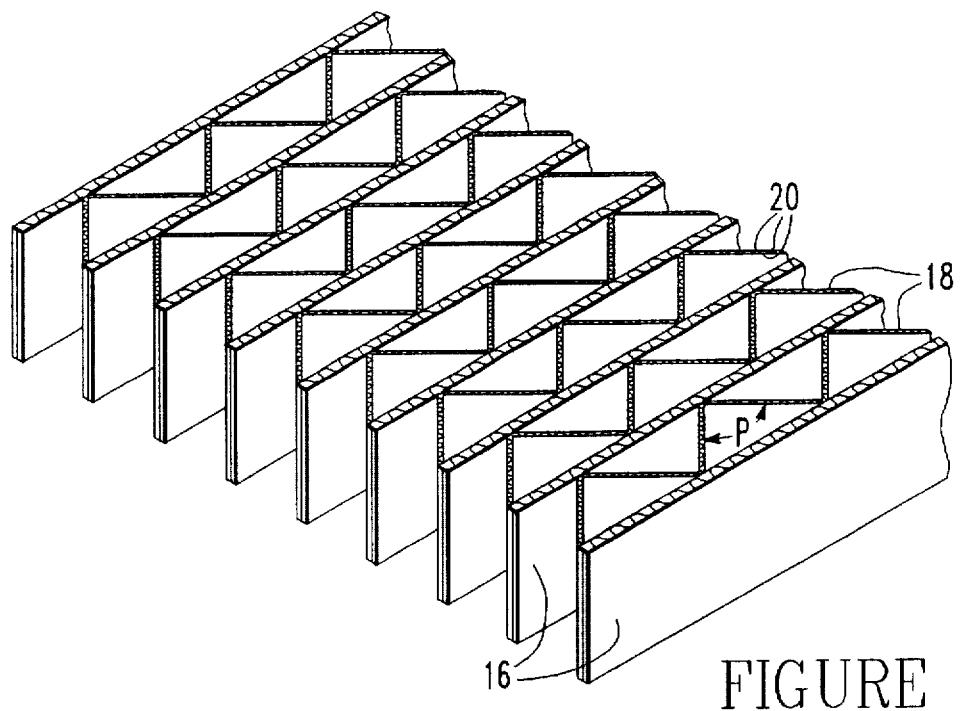
FIG. 3 is yet another embodiment of a support structure having multiple layers according to the present invention.

FIG. 3 shows another embodiment of multiple layer support structure having a thin rectangular shape. This particular embodiment is similar to one typically used for shelves or planks.

Figure 4:
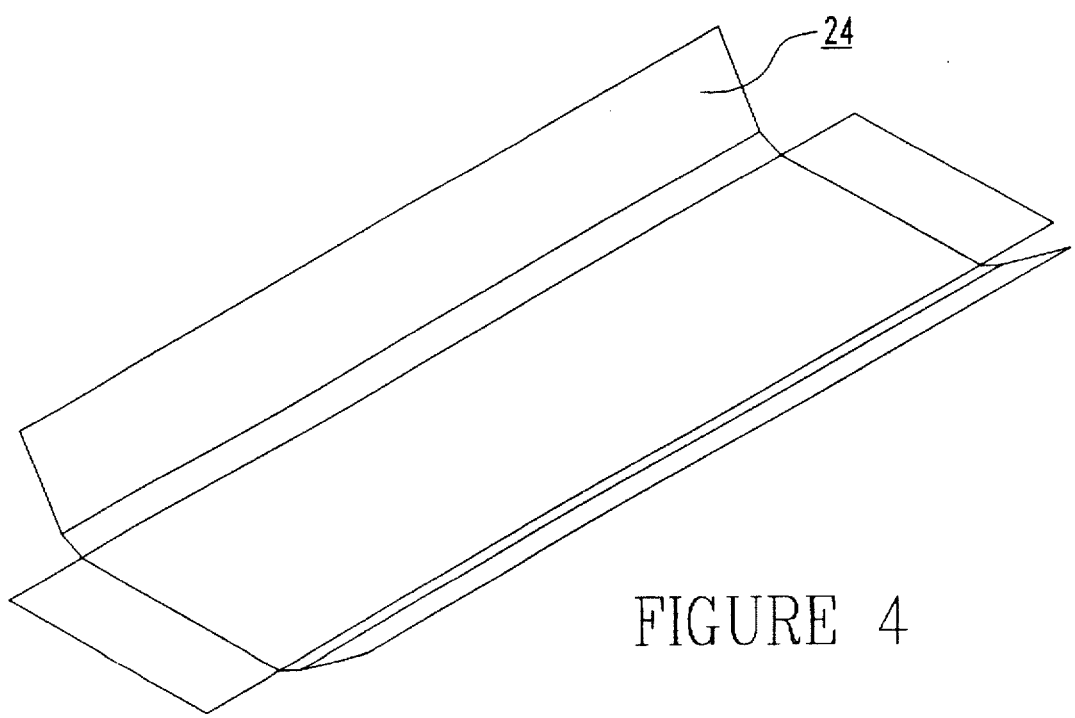
FIG. 4 is a perspective view of a cover for substantially wrapping around a multiple layer support structure according to the present invention.

As shown in FIG. 4, a cover 24 may be wrapped substantially around the core 12 for further reinforcing and restricting movement of the strips. Preferably, the cover 24 is adhesively secured to the core 12. The cover 24 may include a plurality of paperboard sheets or have at least one sheet of liner board. Alternatively, a light weight cover or veneer may be added for cosmetic reasons.

Alternatively, the cover 24 may be formed of a material selected from plastic, paper, and metal or any combination thereof. For a metal support structure, such as one composed of corrugated aluminum foil or sheeting, in lieu of an adhesive, a welding process may be utilized for securing the strips together. For a plastic support structure, the bent strips may be preheated for attachment to the spacer strips. A plastic cover may be especially useful in an environment where moisture would otherwise degrade the structural integrity of a paperboard core of spacer strips 16 and bent strips 18.

A preferred support structure 10 for supporting a load includes a plurality of individual cores 12 of connected strips 14. Each of the cores 12 includes spacer strips 16 of corrugated material and bent strips 18 of laminated material 20. Bent strips 18 are disposed between opposing spacer strips 16 and secured to opposing spacer strips at bend surfaces 22 spaced apart along each of the bent strips 18. Any two of the bent strips 18 are secured to opposite sides of at least one of the spacer strips 16. The bent strips 18 and the opposing spacer strips 16 have edge surfaces for supporting the load. The edge surfaces define a plane substantially perpendicular to the bend surfaces 22. At least two of the cores 12 are aligned substantially in parallel and at least one of the cores 12 interconnect the parallel cores 26 to provide a support surface therebetween. A cover 24 individually wrapped around a substantial portion of each of the interconnecting cores 28 provides for restricting movement of the strips 14 within each of the covers 24. The interconnecting core 28 and cover 24 combination is preferably substantially parallel to the parallel cores 26.

A preferred support structure 10 formed of corrugated paperboard uses sixty-nine pound paperboard to make the corrugated paperboard of the spacer strips 16. A preferred bent strip 18 formed from corrugated paperboard may use sixty-nine pound paperboard as well. However, the preferred fluting of the spacer strips 16 is a b flute, while the preferred fluting of the bent strips 18 is an e flute. The opposed spacer strips 16 are preferably 0.7 inches apart. A twelve inch segment of a preferred support structure may include spacer strips 16 that are twelve inches long and a bent strip 18 that is approximately eighteen inches long when stretched flat.

Figure 5:
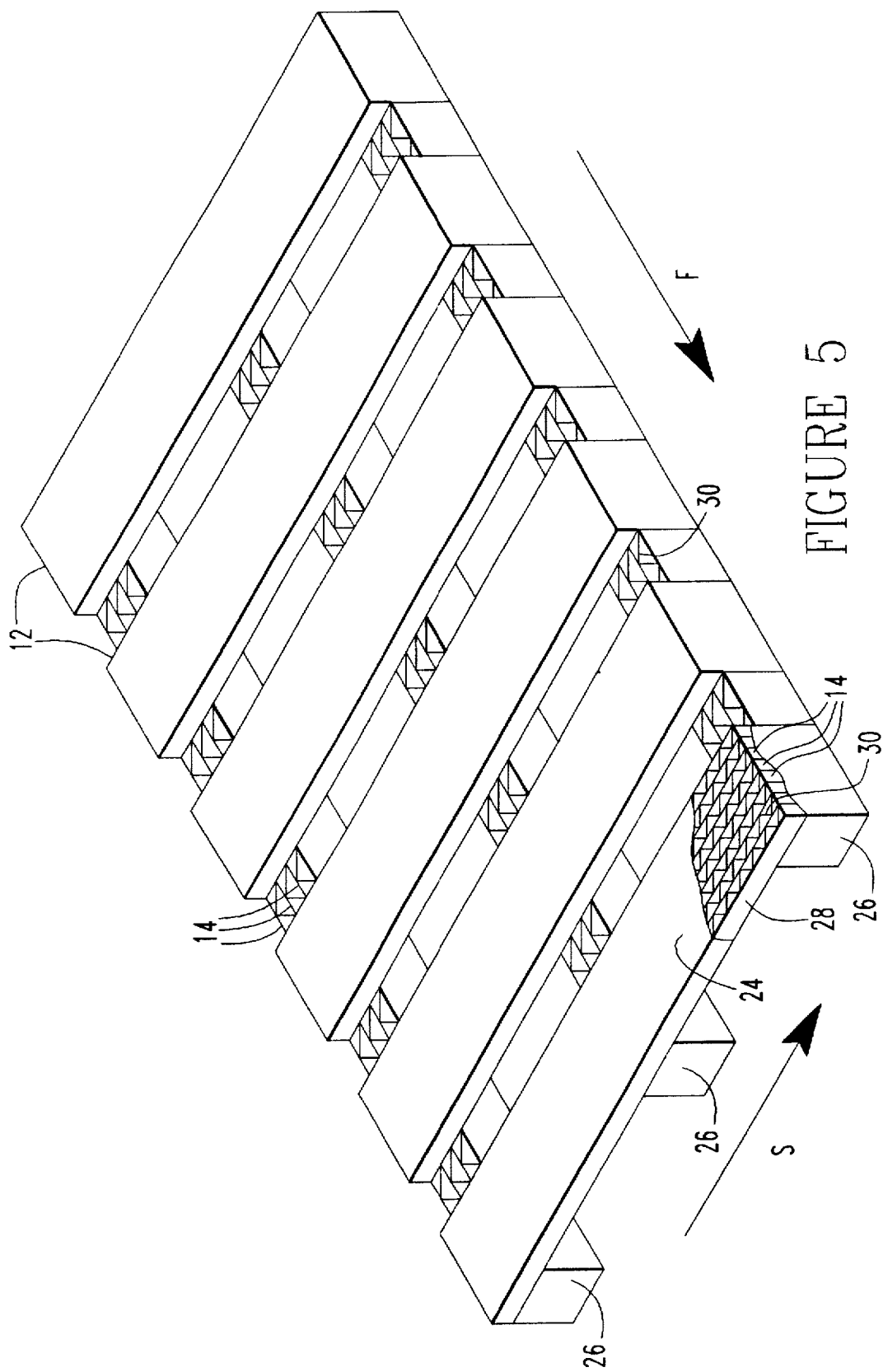
FIG. 5 is a perspective view, partially cut away, of a skid according to the present invention.
Figure 6:
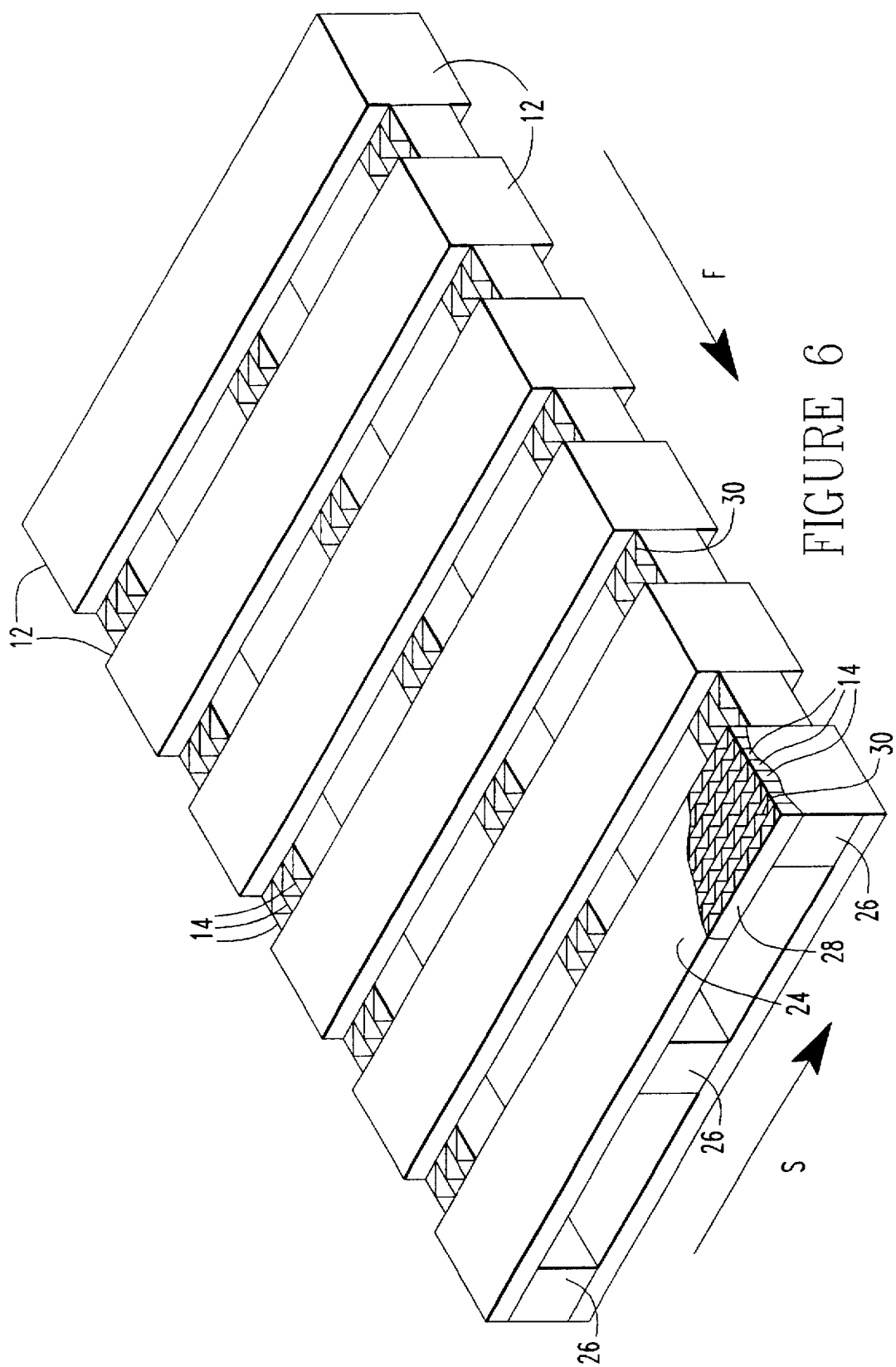
FIG. 6 is a perspective view, partially cut away, of a pallet according to the present invention.
Figure 7:
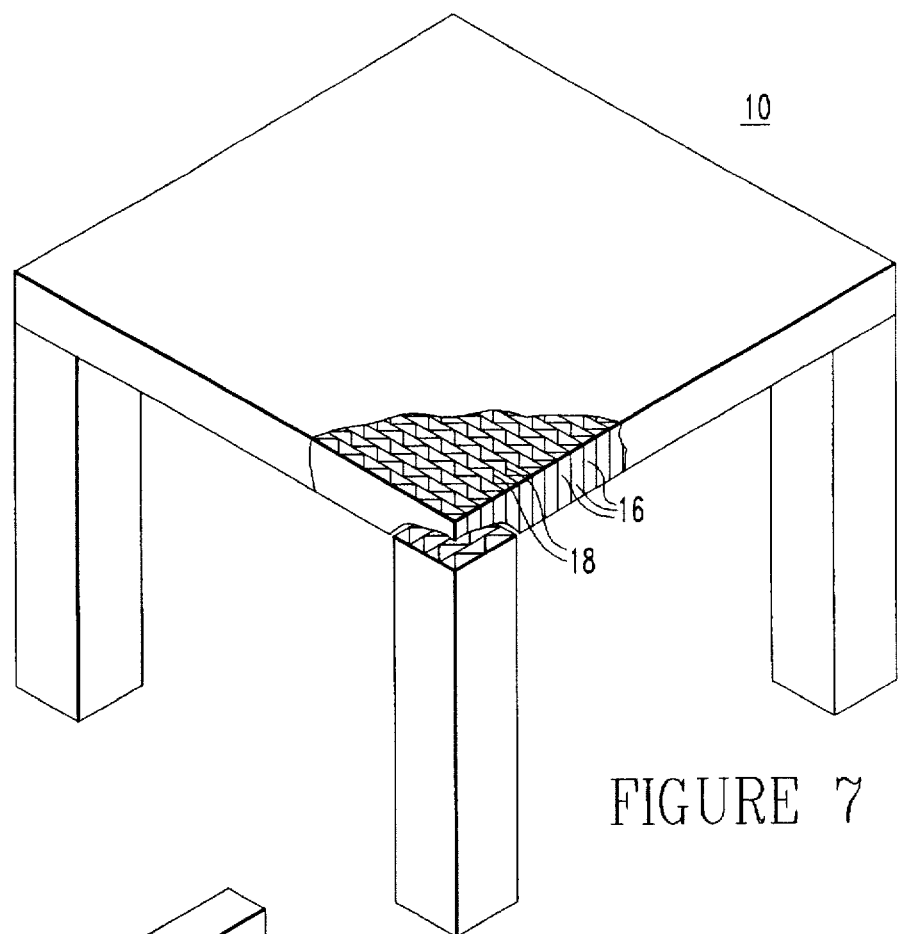
FIG. 7 is a perspective view, partially cut away, of a table according to the present invention.
Figure 8:
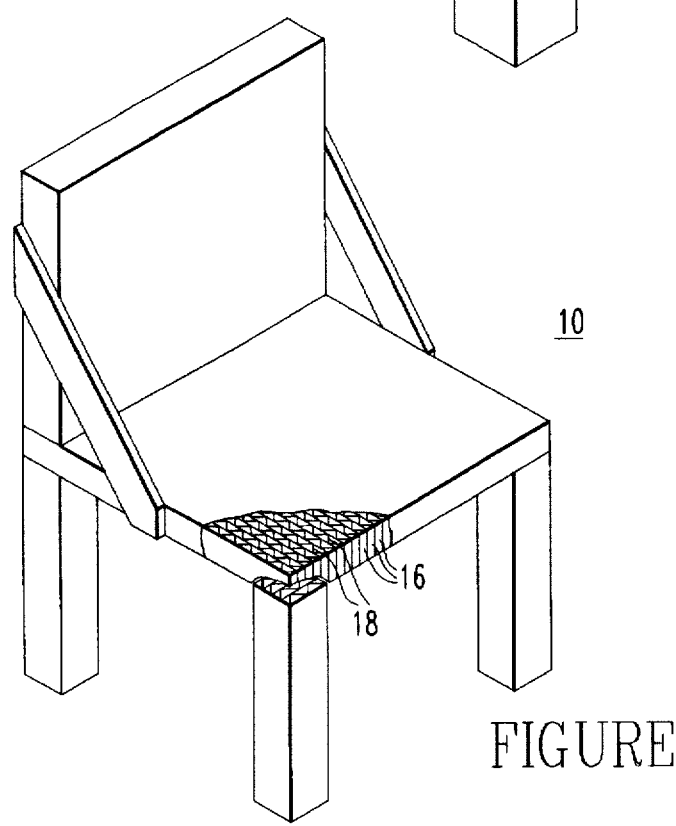
FIG. 8 is a perspective view, partially cut away, of a chair according to the present invention.

A preferred application of the support structure 10 for supporting a load is a skid, as illustrated in FIG. 5. A skid includes a plurality of individual cores 12 of connected paper strips 14 as defined in the previous paragraph. In the skid of FIG. 5, the corrugations 30 of the lower cores 26 define a first fluting direction F and corrugations 30 of the upper core 28 define a second fluting direction S. The first and second fluting directions F, S are substantially perpendicular.

The present invention has utility in a connection with a wide variety of support structures. For example, as illustrated in FIGS. 3, 6, 7 and 8, support structures embodying features of the present invention may include shelves, pallets, tables, and chairs, to name a few. The support structure may include three substantially parallel spacer strips 16 of corrugated material and bent strips 18 of laminated material. At least one of the bent strips 18 is interposed between each of the spacer strips 16. The bent strips 18 are adhesively secured to the spacer strips 16 at bend surfaces 22 spaced apart along the bent strips 18. Selected ones of the bent strips 18 are secured along opposite sides of at least one of the spacer strips 16. The spacer strips 16 and the bent strips 18 have edged surfaces for supporting the load. The edged surfaces define a plane substantially perpendicular to the bend surfaces 22.

Figure 9:
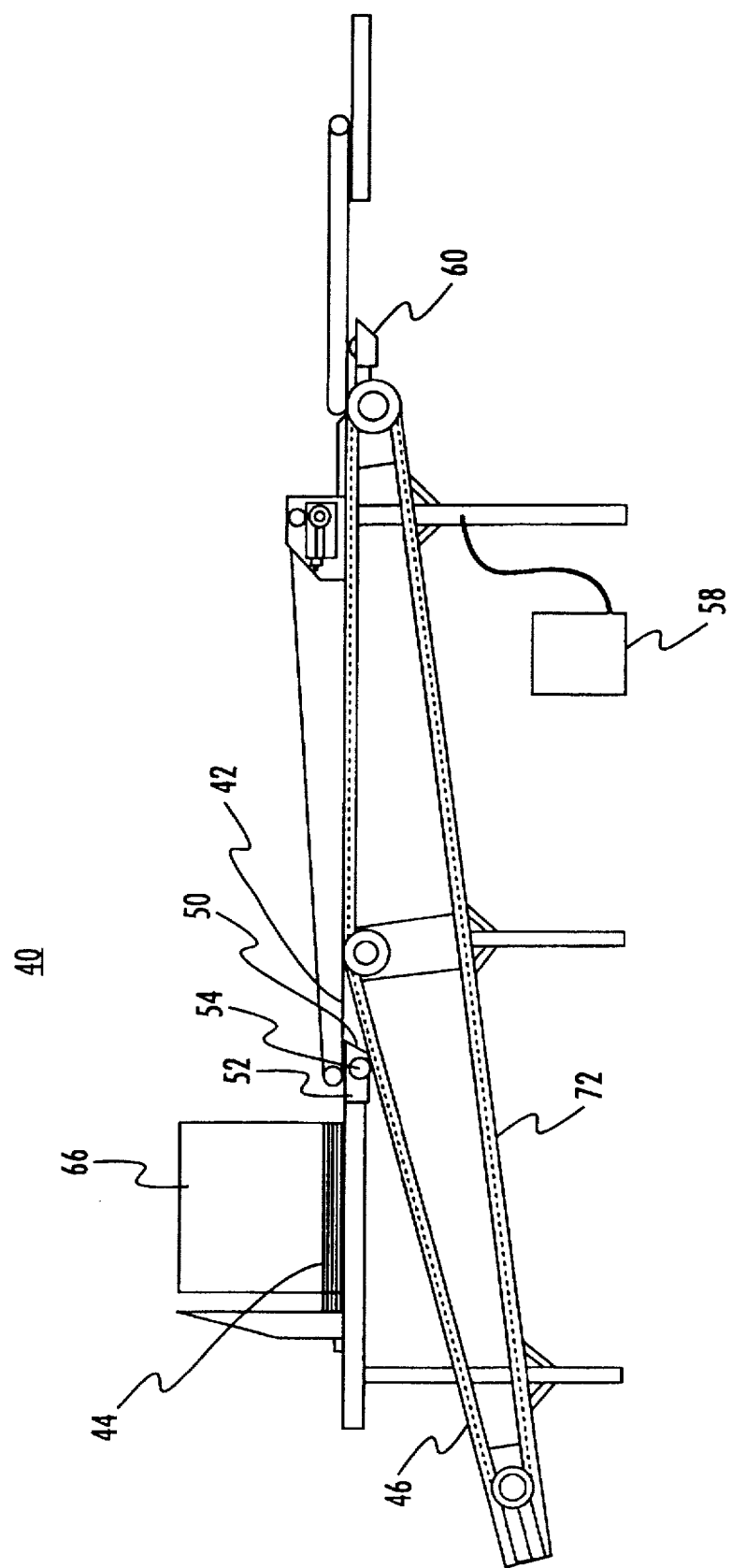
FIG. 9 is a cross-sectional side view of an embodiment of a preferred apparatus of the present invention.

An exemplary embodiment of an apparatus in accordance with the present invention is shown in FIG. 9 and is designated generally by the reference numeral 40. As shown in FIG. 9, the apparatus 40 for forming a corrugated substrate includes a first assembly 42 for advancing liner sheets 44 including a corrugated medium and facing sheets, which are described as spacer strips 16 in the product description, and a second assembly 46 for advancing fluting sheets 48, which are described as bent strips 18 in the product description. Each fluting sheet 48 has bend surfaces 22 along its top and bottom sides. An applicator 50 applies adhesive along at least one of the top and bottom sides of the fluting sheets 48. The applicator 50 in the embodiment of FIG. 9 preferably includes a glue pan 52 and application roll 54, which applies glue to the bend surfaces 22 on the top side of fluting sheet 48. The first assembly 42 and second assembly 46 advance the liner sheets 44 and fluting sheets 48 into contact with one another along the side of the fluting sheet 48 having the adhesive. The fluting sheets 48 are secured to the liner sheets 44 to form a layered article 56 having an upper and lower surface.

In accordance with the invention, a means for correlating operates the first assembly 42, second assembly 46, and applicator 50 so that in each cycle of operation, the layered article 56 adheres to at least an additional layered article 56 in succession. Each additional layered article 56 preferably adheres to a preceding layered article 56. Additional liner sheets 44 may be interspersed between layered articles 56 according to the design requirements for the corrugated substrate.

The correlating means is preferably a computer 58 which controls the sequence of operations of the various elements of the present invention. Preferably, a series of sensors, such as optical sensors and pressure sensors, provide the necessary input to the computer 58 so that the liner sheets 44, fluting sheets 48, and layered articles 56 may be tracked through the various stages of operation. Computer 58 preferably operates the first assembly 42, second assembly 46, and applicator 50 so that another one of the liner sheets 44 adheres along an exposed one of the top and bottom sides of one of the fluting sheets 48 of the layered article 56 corresponding to the upper and lower surface of the layered article 56, respectively. Computer 58 controls the sequence of operations so that at certain times the first assembly 42 advances liner sheets 44 alone and at other times the first assembly 42, second assembly 46, and applicator 50 cooperate to advance the layered articles 56. Liner sheets 44 and layered articles 56 may be advanced and adhered to one another in virtually any sequence to satisfy a particular design criteria for a given corrugated substrate. For example, a corrugated substrate may include a liner sheet 44 followed by a layered article 56, another liner sheet 44, and finally another layered article 56. While the preferred correlating means is a computer 58, it is contemplated as well within the scope of this invention that the sequence of operations to form a particular corrugated substrate configuration may be controlled by either mechanical coordination between the various elements to control the timing and sequence of operations or through controlling the availability of liner sheets and fluting sheets to the first and second assemblies, respectively.

For the layered articles 56 and liner sheets 44 to adhere to one another regardless of the sequence of assembly, adhesive needs to be applied between the respective layers of the corrugated substrate. Applicator 50 can apply adhesive to the bottom side of the fluting sheets 48 as well as the top side so that layered articles 56 will adhere to liner sheets 44 or layered articles 56 upon which it may be stacked. A preferable embodiment includes a second applicator 60 for applying adhesive to the bottom surface of liner sheets 44 or layered articles 56 prior to being stacked upon other liner sheets 44 or layered articles 56.

While the preferred embodiment shown in FIG. 9 has the first assembly 42 for advancing liner sheets 44 oriented above the second assembly 46 for advancing fluting sheets 48, it is contemplated as well within the scope of this invention that the second assembly 46 can be placed above the first assembly 42.

Figure 10:
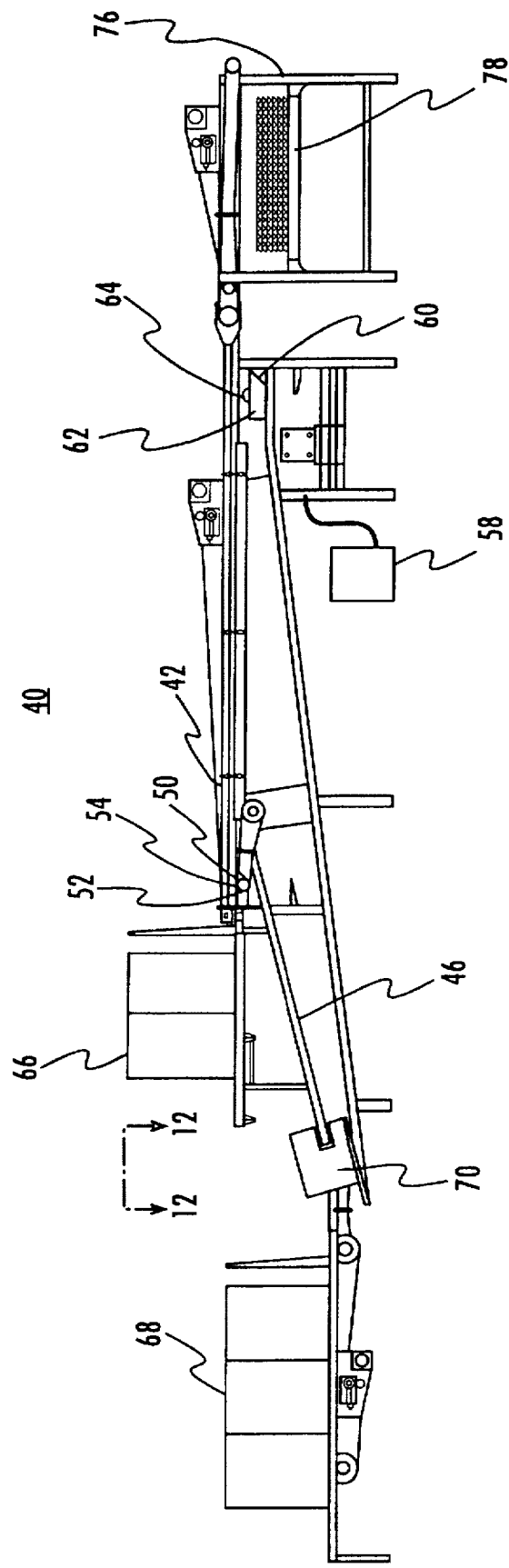
FIG. 10 is a side view of another embodiment of a preferred apparatus of the present invention.

As embodied herein, and referring in FIG. 10, the apparatus 40 includes a first assembly 42 for advancing liner sheets 44 and a first applicator 50 for applying adhesive. A second assembly 46 advances fluting sheets 48 having bend surfaces 22 along its top and bottom sides. The first applicator 50 applies adhesive along the top side of the fluting sheets 48. The first assembly 42 and the second assembly 46 advance the liner sheets 44 and fluting sheets 48 into contact with one another along the top of the fluting sheets 48. The fluting sheets 48 are thereby secured to the liner sheets 44 to form a layered article 56. A second applicator 60 applies adhesive to the bend surfaces 22 along the bottom side of the fluting sheets 48 of the layered article 56 corresponding to the lower surface of the layered article 56. The applicator 60 preferably includes a glue pan 62 and application roll 64. Computer 58 operates the first assembly 42, first applicator 50, second assembly 46, and second applicator 60 so that in each cycle of the operation, the layered article 56 adheres to at least an additional layered article 56 in succession in each cycle of operation. At least one liner sheet 44 may be between the succession of layered articles depending upon the design requirements of the corrugated substrate. Each additional layered article 56 adheres to a preceding layered article 56 or liner sheet 44. Computer 58 also may ensure that another one of the liner sheets 44 adheres along any exposed sides of fluting sheets 48 of the layered article 56.

Figure 11:
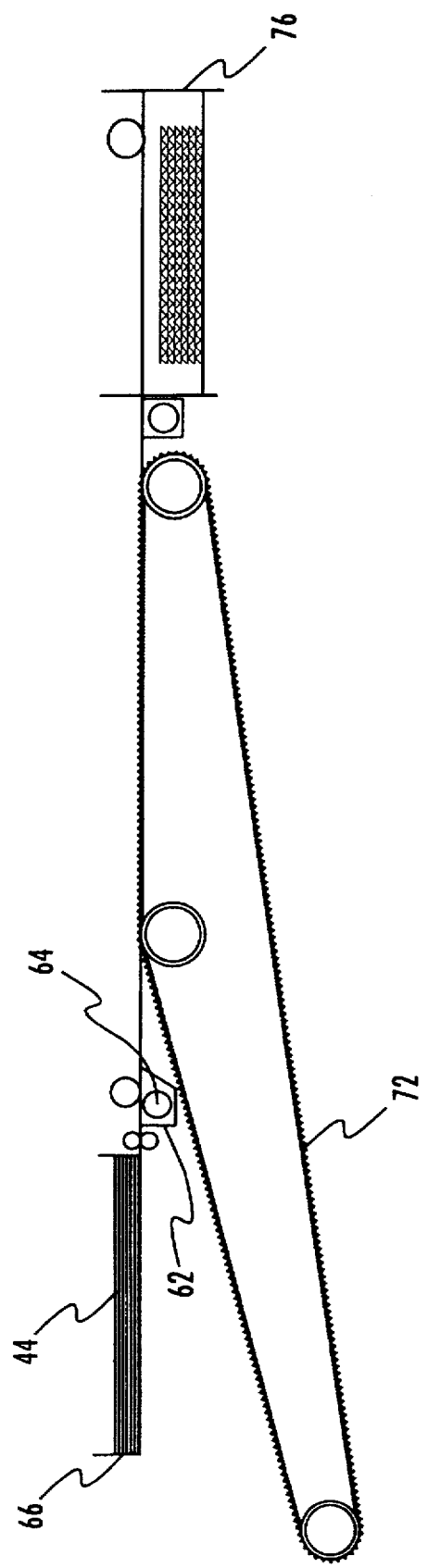
FIG. 11 is a cross-sectional side view of a portion of a preferred apparatus including the endless belt conveyor.

In accordance with the invention, a liner bed 66 is preferably adapted to support a stack of liner sheets 44 and a fluting bed 68 is preferably adapted to support a stack of fluting sheets 48. The liner bed 66 and fluting bed 68 are preferably oriented substantially adjacent to the first assembly 42 and second assembly 46, respectively. Preferably, the first assembly 42 and second assembly 46 include a conveyor assembly for advancing the liner sheets 44 and fluting sheets 48, respectively, one by one. First assembly 42 is most preferably a top vacuum conveyor for advancing the liner sheets 44 and layered articles 56 until deposited upon preceding liner sheets 44 and/or layered articles 56 to form a corrugated substrate. As best illustrated in FIG. 11, second assembly 46 is most preferably a conveyor having an endless belt 72 of plastic teeth, which matches the contour of the fluting sheets 48 and advances the fluting sheets 48 into contact with the liner sheets 44.

Figure 12:
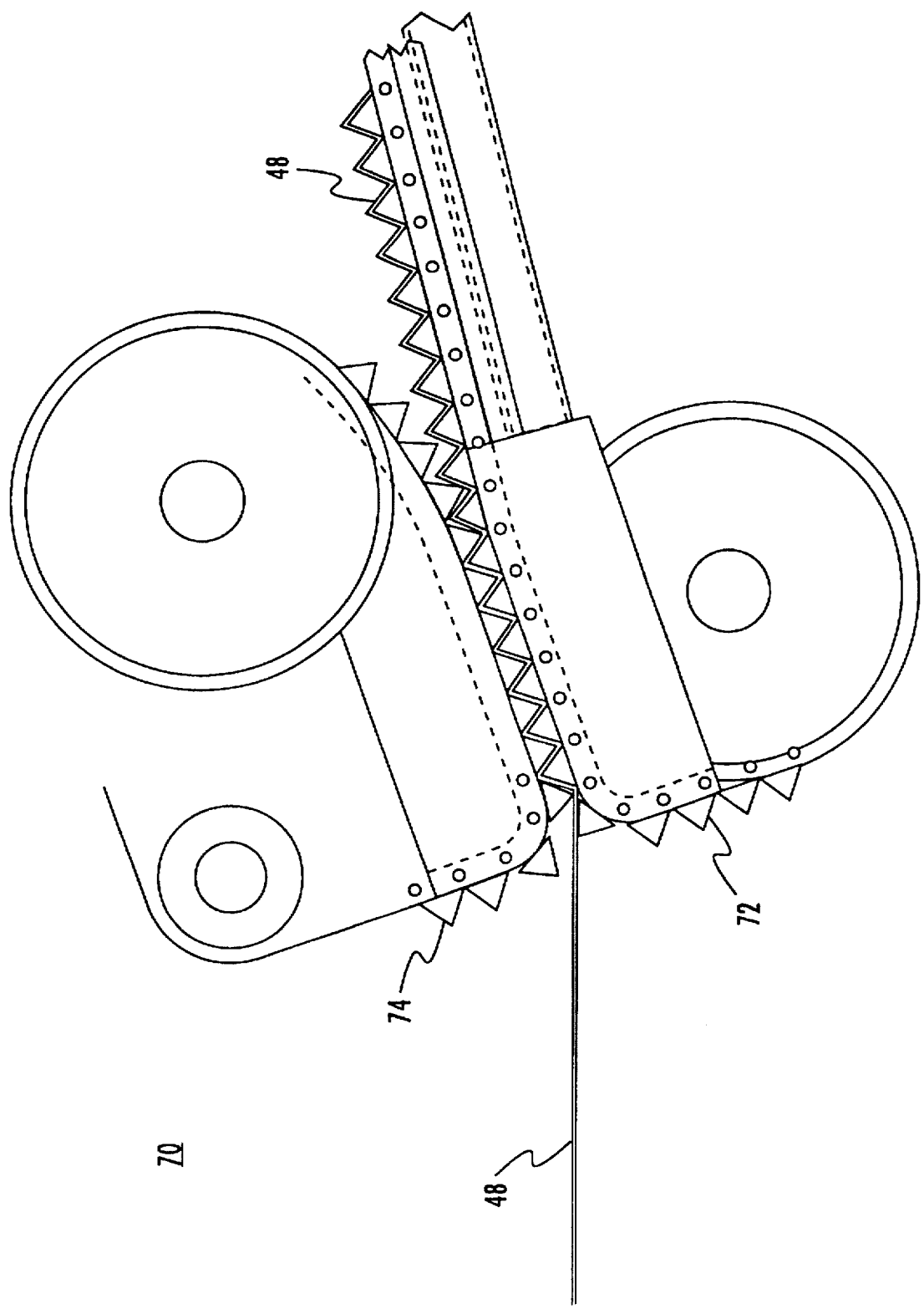
FIG. 12 is a detailed cross-sectional side view of the embossing assembly taken along line 12—12 of FIG. 10.

As shown in FIG. 10, the invention also may include an embossing assembly 70 for receiving the fluting sheets 48 from the fluting bed 68 and for forming the sheets into fluting having bend surfaces 22 along top and bottom sides thereof. As best illustrated in FIG. 12, embossing assembly 70 preferably includes an endless belt 74 of plastic teeth, which cooperate with the plastic teeth of endless belt 72 to form or bend fluting sheet blanks into fluting sheets 48. As shown in FIGS. 1A–1D, many variations on the form or configuration of the fluting sheets 48 may be required by the design criteria of the corrugated substrate. Corresponding changes to the endless belts 72, 74 can form these configurations in the fluting sheets 48. While a preferred embodiment of the present invention uses the embossing assembly 70 to form the fluting sheets 48 from blanks provided by the fluting bed 68, it is contemplated as well within the scope of this invention that the fluting bed 68 may contain fluting sheets 48 which are pre-formed so as to obviate the need for the embossing assembly 70.

Each of the liner sheets 44 and fluting sheets 48 are preferably formed of material selected from a group consisting of metal, paperboard, and plastic. Fluting bed 68 typically contains material of lesser strength for the fluting sheets 48 than that contained in the liner bed 66 for the liner sheets 44. Depending upon the selected materials and design requirements of the corrugated substrate, however, the fluting sheets 48 may be stronger than liner sheets 44. The liner sheets 44 and fluting sheets 48 can be of the same material or of different materials depending on the design requirements. Additionally, while a preferred embodiment of the present invention includes both a liner bed 66 and a fluting bed 68, it is contemplated as well within the scope of this invention that a single bed may contain the material for both the liner sheets 44 and fluting sheets 48.

As shown in FIG. 10, the invention may also include a downfeed stacker 76 having a vertically movable plate assembly 78 for receiving each of the layered articles 56 and the liner sheets 44 for final assembly of the corrugated substrate. Preferably, the top vacuum conveyor of first assembly 42 deposits the liner sheets 44 and fluting sheets 48 onto the stacker 76 to form the corrugated substrate. Computer 58 may control each cycle of the operation so that the layered article 56 is fed to the stacker 76 and secured to at least an additional layered article 56 in succession in each cycle of operation. The liner sheets 44 are preferably fed directly to the stacker 76 without application of adhesive from the first and second applicators 50, 60. At least two of the layered articles 56 are preferably fed in succession to the stacker during each cycle of operation so that the thickness of the corrugated substrate may be varied. Alternatively, additional liner sheets 44 may be added to control the thickness and strength of the corrugated substrate. The liner sheets 44 may also be placed between the succession of layered articles 56 to meet the design requirements of a particular corrugated substrate.

Computer 58 preferably includes means for regulating the thickness of the corrugated substrate so that in each cycle of operation at least one layered article 56 is fed to the stacker 76. The regulating means is preferably a computer program, which provides the instructions as to what combinations of the liner sheets 44 and layered articles 56 will provide a corrugated substrate of a given thickness.

A method for forming a corrugated substrate from corrugated material according to the present invention comprises the steps of: providing liners including a corrugated medium and facing sheets and undulating corrugated strips having bend surfaces along opposite sides thereof; connecting one of the liners to the bend surfaces along one of the sides of one of the undulating corrugated strips to form a layered article; and controlling the thickness of the substrate by depositing at least one additional layered article in succession in each cycle of operation, whereby each additional layered article adheres to a preceding layered article. Further, the invention may include the step of introducing at least an additional one of the liners into the succession of additional layered articles to further control thickness and strength of the structure, whereby the additional one of the liners adheres to a preceding one of the layered articles or one of the corrugating liners. The step of controlling preferably includes connecting the outermost portions of the undulating strip opposite the liner of the layered article to another one of the liners if not covered by an adjacent layered article.

In accordance with the invention, a method of forming a corrugated substrate from corrugated material comprises the steps of: providing a first liner including a corrugated medium and facing sheets; forming a layered article having a second liner including a corrugated medium and facing sheets and an undulating corrugated strip connected thereto; connecting outermost portions of the undulating strip opposite the second liner to the first liner, thereby adhering the first liner to the layered article; and controlling the thickness of the substrate by depositing at least one additional layered article in succession in each cycle of operation, whereby the additional layered article adheres to a preceding layered article. The step of providing may further include conveying the first liner to a stacker. The step of connecting preferably includes applying adhesive to outermost portions of the undulating strip opposite the second liner. The method may further include the step of conveying the layered article to the stacker after the step of forming. A curing step may be used in connection with certain adhesives after at least one of the steps of forming and connecting. The curing step includes the step of providing heat from electric heaters or steam heaters.

As described in greater detail above with respect to the corrugated support structure, the liner sheets and fluting sheets may be formed of material selected from a group consisting of metal, paper board, and plastic. Each of the liner sheets and fluting sheets may have corrugations defining a fluting direction. The fluting direction of the liner sheets and the fluting sheets may be in either the same direction or in different directions from one another depending on the design requirements of the corrugated substrate.

The present invention enables the construction of a durable corrugated substrate that is made from liner sheets of corrugated material and a fluting sheets of laminated material. The strength and weight of the corrugated material itself can be increased or decreased according to the needs of the user. The fluting sheets can have its number of laminated layers changed by modifying the type of material used or by modifying the thickness of the material accordingly. The present invention provides an easy and quick way to change a corrugated substrate in size, weight, strength, and rigidity to meet the requirements of the loads to be placed upon it by simply modifying the selected materials, adding or removing layered articles, and adjusting the number of liner sheets. The present invention provides a corrugated substrate with reduced weight and increased strength characteristics by utilizing the edge-wise strength of the selected materials in a geometric configuration that exploits the strength characteristics of corrugation beyond that known in the art.

While there has been illustrated and described what is at present considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed herein, but that the invention include all embodiments falling within the scope of the appended claims.

I claim:

1. An apparatus for forming a corrugated substrate comprising:
    (a) first means for advancing liner sheets including a corrugated medium and facing sheets;
    (b) an embossing assembly for forming blank sheets including a corrugated medium and facing sheets into fluting sheets having bend surfaces along top and bottom sides thereof;
    (c) second means for advancing said fluting sheets positioned downstream of said embossing assembly;
    (d) an applicator for applying adhesive along at least one of said top and bottom sides, at least one of said first advancing means and said second advancing means advancing said fluting sheets and said liner sheets into contact with one another along at least one of said top and bottom sides having adhesive applied, thereby securing one of said fluting sheets to at least one of said liner sheets to form a layered article having an upper and lower surface; and
    (e) means for correlating operation of elements (a)–(d) so that in each cycle of operation:
        said layered article adheres to at least an additional layered article in succession, whereby each additional layered article adheres to a preceding layered article; and
        another one of said liner sheets advanced by said first advancing means adheres along an exposed one of top and bottom sides of one of said fluting sheets of said layered article corresponding to said upper and lower surface of said layered article respectively.

2. An apparatus for forming a corrugated substrate comprising:
    (a) first means for advancing liner sheets including a corrugated medium and facing sheets;
    (b) a first applicator for applying adhesive;
    (c) second means for advancing fluting sheets including a corrugated medium and facing sheets, said fluting sheets having bend surfaces along top and bottom sides thereof, said first applicator applying adhesive along a selected one of said top and bottom sides, at least one of said first advancing means and said second advancing means advancing said fluting sheets and said liner sheets into contact with one another along said selected one of said top and bottom sides, thereby securing one of said fluting sheets to one of said liner sheets to form a layered article;

(d) an embossing assembly for forming blank sheets including a corrugated medium and facing sheets into said fluting sheets having bend surfaces along top and bottom sides thereof, said embossing assembly positioned upstream of said second advancing means;

(e) a second applicator for applying adhesive to said bend surfaces along a remaining one of said top and bottom sides of said fluting sheets of said layered article corresponding to a remaining one of an upper or lower surface of said layered article; and (f) means for correlating operation of elements (a)–(e) so that in each cycle of operation:
said layered article adheres to at least an additional layered article in succession in each cycle of operation, whereby each additional layered article adheres to a preceding layered article; and
another one of said liner sheets adheres along said remaining one of said upper and lower surface of said layered article.

3. The apparatus as defined in claim 2, further comprising a liner bed adapted to support a stack of liner sheets, said liner bed being substantially adjacent said first advancing means.

4. The apparatus as defined in claim 3, wherein said first advancing means includes a conveyor assembly substantially adjacent said liner bed for advancing said liner sheets one by one.

5. The apparatus as defined in claim 2, further comprising a fluting bed adapted to support a stack of fluting sheets, said fluting bed being substantially adjacent said second advancing means.

6. The apparatus as defined in claim 2, further comprising a stacker for receiving each of said layered articles and said liner sheets as determined by said correlating means for final assembly of the corrugated substrate.

7. The apparatus as defined in claim 2, wherein said second advancing means includes a conveyor assembly.

8. The apparatus as defined in claim 1, wherein said correlating means operates elements (a)–(d) so that in each cycle of operation:
said layered article is fed to a stacker and secured to at least an additional layered article in succession in each cycle of operation, whereby each additional layered article adheres to a preceding layered article; and
said another one of said liner sheets is fed from said first advancing means directly to a stacker without application of adhesive from said first and said second applicator.

9. The apparatus as defined in claim 8, wherein said correlating means is capable of feeding at least two of said layered articles in succession to said stacker during each cycle of operation, so that the thickness of the corrugated substrate may be varied.

10. The apparatus as defined in claim 8, wherein said correlating means includes means for regulating the thickness of the corrugated substrate so that in each cycle of operation at least one layered article is fed to said stacker.

11. The apparatus as defined in claim 2, wherein said first and second advancing means are capable of advancing said liner sheets and said fluting sheets, respectively, being formed of material selected from a group consisting of metal, paperboard, and plastic.

12. An apparatus for forming a corrugated substrate comprising:

(a) a liner bed adapted to support a stack of liner sheets including a corrugated medium and facing sheets;

(b) a first conveyor assembly substantially adjacent said liner bed for advancing said liner sheets one by one to a stacking section;

(c) a fluting bed adapted to support a stack of blank sheets including a corrugated medium and facing sheets;

(d) an embossing assembly for receiving said blank sheets from said fluting bed and for forming said blank sheets into fluting sheets having bend surfaces along top and bottom sides thereof;

(e) a first applicator for applying adhesive to said bend surfaces along a selected one of said top and bottom sides;

(f) a secondary conveyor assembly positioned downstream of said embossing assembly for advancing said fluting sheets into contact with said liner sheets along said selected one of said top and bottom sides, thereby securing one of said fluting sheets to one of said liner sheets to form a layered article;

(g) a second applicator for applying adhesive to said bend surfaces along a remaining one of said top and bottom sides of said fluting sheets of said layered article corresponding to a remaining one of an upper and lower surface of said layered article; and (h) means for correlating operation of elements (a)–(g) so that in each cycle of operation:
an initial liner sheet is fed directly to said stacker; and
said layered article is fed to said stacker and secured to said initial liner along said remaining one of said upper and lower surfaces.

* * * * *

UNITED STATES PATENT AND TRADEMARK OFFICE
CERTIFICATE OF CORRECTION

PATENT NO.: 5,792,307

DATED: August 11, 1998

INVENTOR(S): Dale E. Montgomery

It is certified that an error appears in the above-identified patent and that said Letters Patent is hereby corrected as shown below:

Claim 7, col. 11, line 43, "assembly" should read --advancing means--.

Signed and Sealed this

Third Day of November, 1998

*Attest:*

*Attesting Officer*

BRUCE LEHMAN

*Commissioner of Patents and Trademarks*